United States Patent [19]

Dalby

[11] Patent Number: 4,669,685
[45] Date of Patent: Jun. 2, 1987

[54] PASSIVE THERMAL RADIATOR FOR EARTH ORBITING SATELLITE

[76] Inventor: James F. Dalby, 11704 Indian Ridge Rd., Reston, Va. 22091

[21] Appl. No.: 687,213

[22] Filed: Dec. 28, 1984

[51] Int. Cl.⁴ .......................... B64G 1/46; B64G 1/54
[52] U.S. Cl. ................................ 244/158 R; 244/163; 165/6
[58] Field of Search ...................... 244/158 R, 163, 57, 244/158 A; 62/467 R, DIG. 1; 165/DIG. 6; 237/79

[56] References Cited

U.S. PATENT DOCUMENTS

| | | | |
|---|---|---|---|
| 2,234,122 | 3/1941 | Heck | 62/467 R |
| 3,310,102 | 3/1967 | Trombe | 62/467 R |
| 3,596,853 | 8/1971 | Anderson | 244/158 A |
| 3,768,754 | 10/1973 | Janes | 244/158 A |
| 4,423,605 | 1/1984 | Petrick et al. | 62/467 R |

Primary Examiner—Trygve M. Blix
Assistant Examiner—Lynn M. Fiorito
Attorney, Agent, or Firm—Pollock, Vande Sande & Priddy

[57] ABSTRACT

An earth orbiting satellite (10) having an interior portion (22) supporting heat generating elements (26) and an exterior portion (12) having a thermal radiator (20) for heat radiated by these elements, is provided with reflectors (34s, 34c) in the annulus between the interior and exterior portions, the reflectors being configured to reflect radiation from the axially extending side surfaces of the heat generating elements to the thermal radiator and to conduct heat from the heat generating elements and radiate the conducted heat to the thermal radiator.

14 Claims, 6 Drawing Figures

PASSIVE THERMAL RADIATOR FOR EARTH ORBITING SATELLITE

CROSS REFERENCE TO RELATED APPLICATION

This application is related to Ser. No. 556,750 filed Nov. 29, 1983, by James F. Dalby for Earth Orbiting Satellite With Improved Passive Thermal Radiator and now U.S. Pat. No. 4,580,748.

DESCRIPTION

1. Technical Field

The present invention concerns earth orbiting satellites of the type which receive transmissions from earth stations and rebroadcast them to other earth stations or detect emanations of various sorts from the solar system and relay information regarding such emanations to earth stations and the like. More particularly, the invention concerns an improved means for rejecting from such a satellite heat which is generated during operation of its electronic components.

2. Background Art

Although earth orbiting communication satellites have been in use for a number of years, the problem of providing adequate cooling for the vital and thermally sensitive electronic components of such satellites has continued to plague designers. Heat resulting from solar radiation can be reflected away from the satellite by providing a suitable reflecting surface on those portions of its exterior not covered with solar cells and other equipment such as antennas. However, the electronics carried within the satellite generate their own heat which somehow must be rejected from the satellite in order to maintain the temperatures of the electronics within safe operational limits and thereby to prolong their life.

One known technique for removing heat from such a satellite is to position the relatively hot electronics elements in packages or compartments located near the periphery of the satellite and to locate a mirror radiator outboard of the electronics to absorb heat radiated by the electronics and re-radiate this heat to the environment of the satellite. One such prior art mirror radiator comprises an exterior layer of quartz which is silvered on its interior side and backed by an aluminum honeycomb which is blackened on its interior side. Such a mirror radiator absorbs heat from its interior side and re-radiates it to the environment of the satellite but also tends to reflect heat reaching the satellite from its environment.

Unfortunately, the thermal absorptance, reflectance and transmittance of the mirror radiator change irreversibly with time so that over the life of the satellite, less and less of the heat generated by the satellite electronics can be rejected through such a mirror radiator. In addition, such a mirror radiator can re-radiate only heat which flows to it radially from the electronics of the satellite. This means, in effect, that most heat radiated axially by the electronics misses the mirror reflector and is absorbed by the interior structure of the satellite. Although such axially radiated heat could, to some extent, be captured by a mirror radiator which is considerably longer than the electronics compartments, such a solution is not optimum since it would result in a loss of satellite surface for photocells, would be expensive due to the high cost of such mirror radiators and would result in a more bulky structure. A need has existed over a number of years for a simple, effective means for absorbing and re-radiating such axially radiated heat without requiring the use of greatly enlarged mirror radiators.

DISCLOSURE OF THE INVENTION

The object of the present invention is to provide an improved means for radiating heat from the interior of a communications satellite.

Another object of the invention is to provide such a means which is simple, inexpensive and compact.

Still another object of the invention is to provide such an improvement which does not require significant modification of existing satellite structures.

A still further object of the invention is to provide such an improvement which can be used with satellites having spinning and despun portions.

These objects of the invention are given only by way of example; therefore, other desirable objectives and advantages inherently achieved by the disclosed invention may occur or become apparent to those skilled in the art. Nonetheless, the scope of the present invention is to be limited only by the appended claims.

The invention is particularly suited for use in earth orbiting satellites of the type which include an exterior housing having a spin axis and a thermal radiator panel extending at least partially around the housing. Within the housing, an interior portion is supported by the exterior housing. A plurality of heat-generating elements, such as compartments or enclosures for the electronics of the satellite, are positioned on this interior portion at locations radially opposite and inward from the thermal radiator panel. Such heat generating elements are configured to radiate heat radially toward the radiator panel, axially into the annulus defined between the heat generating elements and the exterior housing and circumferentially toward adjacent heat generating elements.

According to the invention, reflector means are mounted along at least a portion of the axially extending edges of the heat generating elements and extended into this annulus, for reflecting heat from the circumferentially facing side surfaces of the heat generating elements toward a larger arc of the thermal radiator panel than would be reached by heat radiating directly to the thermal radiator panel from such side surfaces in the absence of the reflector means. Such reflector means can be placed along both edges, one edge or staggered along portions of the axial edges of the heat-generating elements.

In the preferred embodiment, the reflector means comprises a plurality of thermally conductive, curved fins extended radially into the annulus between the interior portion and the exterior housing. The sides of the fins exposed to the circumferentially facing side surfaces are mirror-like; whereas, their opposite sides are darkened to have high thermal emissivity. Thus, the reflector also functions as a heat transfer fin which conducts heat from the heat generating element and radiates this heat to the inside of the radiator panel. The radiative capacity of the hot outer surface of the heat generating element is thereby enhanced due to the increased radiating area. In one embodiment, the fins are parabolic in shape; however, straight fins also provide improved heat transfer.

BEST MODE FOR CARRYING OUT THE INVENTION

Figure 1:
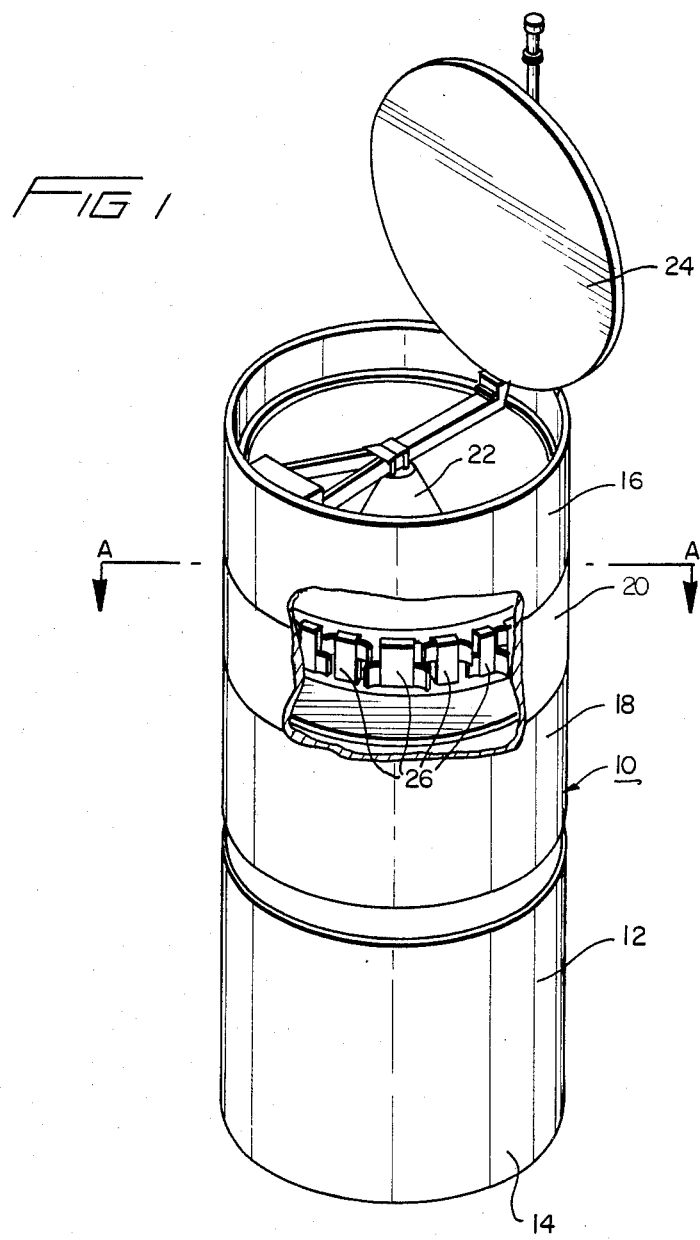
FIG. 1 shows a perspective view, partially broken away, of an earth orbiting satellite of the type particularly suited for modification in accordance with the present invention.

The invention will be described with reference to the drawings in which like reference numerals identify like elements of structure in each of the several Figures.

FIG. 1 illustrates schematically an earth orbiting satellite 10 of a type particularly suited for modification in accordance with the present invention. The satellite is shown in its deployed configuration as it would appear in orbit. An exterior housing member 12 surrounds most of the components of the satellite and, in the now familiar manner, spins about the longitudinal axis of the satellite following deployment. Housing 12 comprises an aft, cylindrical solar panel 14 and a forward, cylindrical surface comprising solar panels 16,18. Between panels 16, 18, a primary, cylindrical thermal radiator panel 20 is provided through which heat generated within the satellite is radiated to its environment.

Within housing 10 are located, among other things, a propulsion unit (not illustrated) which spins with the housing and is supported by it, plus a despun (that is, not spinning) payload compartment or interior portion 22. This despun portion is supported by but does not rotate with housing 12; so that, an antenna reflector 24 supported by the despun portion can be maintained in a relatively constant orientation relative to a beacon transmitting station located on the earth. A suitable arrangement for mounting such an antenna reflector is disclosed in U.S. Pat. No. 4,465,951 granted to the present applicant for Backup Bearing and Power Transfer Assembly for Communication Satellite.

Despun interior portion 22 supports on its circumference a plurality of heat-generating elements 26 such as electronic modules whose heat must be led away from the interior of the satellite to prevent overheating. For example, elements 26 may comprise travelling wave tube amplifiers and associated electrical power conditioners. The heat-generating elements 26 are positioned opposite thermal radiator panel 20 so that heat radiated from them in a generally radial direction will be transmitted from the satellite through thermal radiator panel 20.

Figure 2:
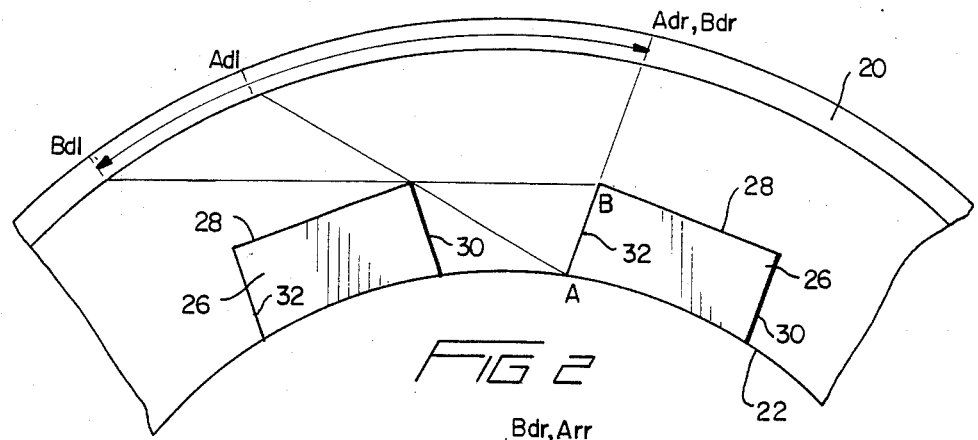
FIG. 2 to 4 show fragmentary views taken along line A—A of FIG. 1 illustrating heat radiation paths with no reflector means, with a straight fin reflector means and with a curved fin reflector means according to the invention.

As shown in the fragmentary sectional view of FIG. 2, the radially outermost face 28 of each heat generating element 26 is positioned directly opposite thermal radiator panel 20 in the manner previously described. In a typical application, radiator panel 20 would comprise an exterior layer of quartz having a reflective inner layer of silver. Contacting the silver layer would be a blackened surface contacting an aluminum honeycomb which includes on its innermost surface a blackened rear panel. As a result of this configuration, solar radiation from the environment of the satellite is reflected away at the surface of the silver layer. On the other hand, radiation from face 28 of each heat generating element 26 is absorbed at the blackened rear panel, conducted through the aluminum honeycomb and silver reflective layer, conducted through the quartz layer and radiated to the environment of the satellite from the outer surface of the quartz.

Radiation leaving face 28 of each heat generating element 26 in a generally radial direction is relatively effectively removed from the interior of the satellite in the manner just described but would be enhanced by any increase in radiating area. However, radiation from the circumferentially facing side surfaces 30,32 of heat-generating elements 26 streams to a much more limited arc of thermal radiator panel 20. A ray streaming directly radially from the radially innermost axially extending edge A of heat generating element 26 or from points between edge A and the radially outermost axially extending edge B will strike the radiator panel 20 at point Adr, Bdr. A ray streaming in a more circumferential direction from edge A at an angle high enough to clear the next adjacent heat generating element will strike the radiator panel at point Adl. Finally, a ray streaming in a more circumferential direction from edge B at an angle high enough to clear the next adjacent heat generating element will strike at point Bdl. Thus, heat radiated from side surface 32 reaches an arc Bdl to Adr, Bdr by direct radiation. Thus, as can be be understood from FIG. 2 and the foregoing discussion, the arc of radiator panel 20 seen by the circumferentially facing side surfaces 30, 32 of each heat generating element is limited by the presence of the next adjacent heat generating elements which block a considerable amount of radiation from directly streaming to the thermal radiator panel 20.

Figure 3:
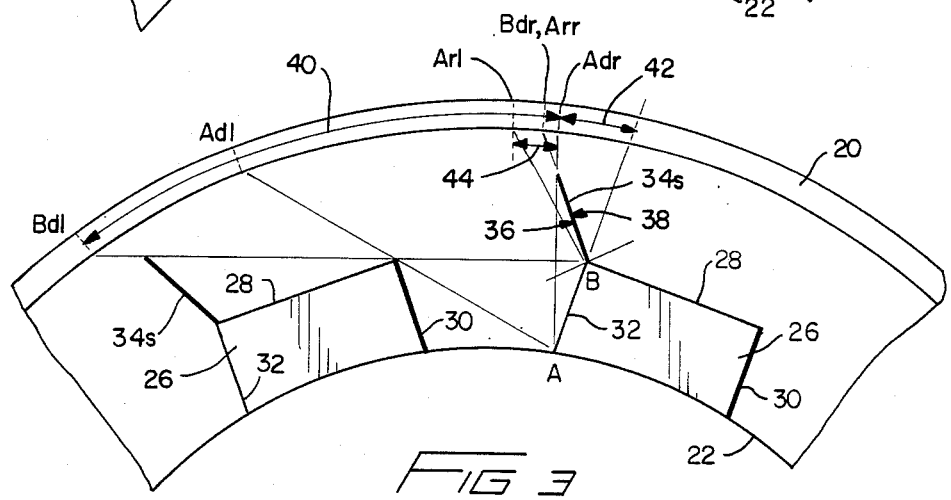

In FIG. 3, a planar or straight reflecting fin 34s has been attached to the outermost axially extending edge B of a heat generating element 26. As a result, heat radiating from side surface 32 will radiate not only directly to the thermal radiator panel 20 in essentially the manner described with regard to FIG. 2 , but also will be reflected by fin 34s toward the thermal radiator panel 20. Fin 34s preferably comprises a self-supporting body of a thermally conductive material such as aluminum provided with a reflecting surface 36 facing toward the side surfaces of adjacent heat generating elements 26. The opposite side of the fin 34s is provided with a blackened surface 38 having a high thermal emissivity which faces away from the side surface of the heat generating element 26. As shown in FIG. 3, a ray streaming from axially extending edge A past the tip of fin 34s will strike thermal radiator panel 20 at point Adr. Also, a ray from edge A past the outermost edge of the next adjacent heat generating element 26 will strike the thermal radiator panel 20 at point Adl. In a similar fashion, rays from the outermost axially extending edge B will strike thermal radiator panel 20 at points Bdr and Pdl, as illustrated. Thus, the direct radiation from side surface 32 reaches an arc 40 of the thermal radiator panel extending from point Bdl to Adr. A short arc 42 is blocked due to the presence of fin 34s. However, rays reflected from surface 36 of fin 34s will strike thermal radiator panel along an arc 44 from Arl to Arr. This arc 44 can be made larger than arc 42 by adjusting the angle between fin 34s and side surface 32, as will be understood by those skilled in the art. Thus, the use of a straight or planar fin 34s along the radially outermost edge of heat generating element 26 can actually increase the total arc of thermal radiator panel 20 which is "seen" by side surface 32.

Figure 4:
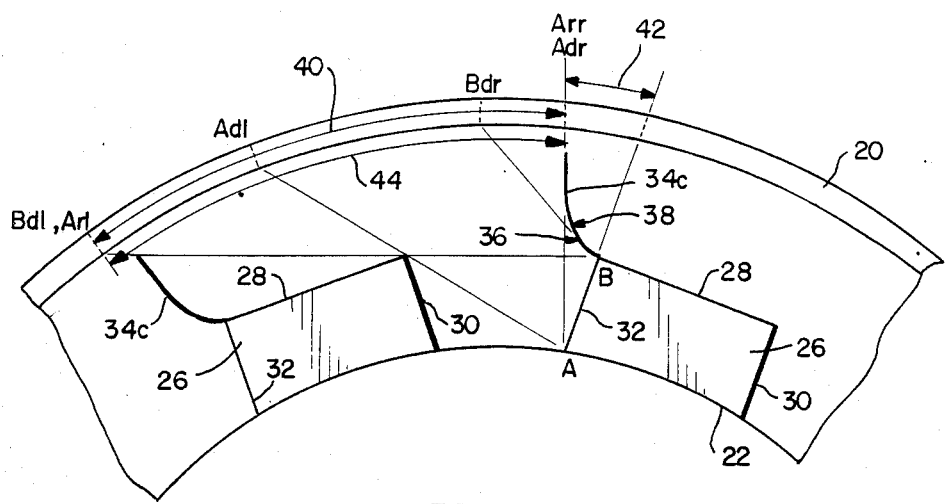

While some improvement in heat transfer can be achieved with a planar or straight fin of the type illustrated in FIG. 3, fins which are convex toward the axially extending side surfaces of the heat generating elements provide substantially better performance. Such an embodiment is illustrated in FIG. 4. Here, because fin 34c is curved, rays streaming from axially extending side surface 32 are reflected to a substantially larger arc 44 of heat radiation panel 20. Preferably, fin 34c is shaped so that a ray from innermost axially extending edge A will be essentially tangent to the surface of fin 34c at its tip. Also, fin 34c preferably is shaped so that a normal to its surface where the fin intersects axially extending edge B will bisect the angle between side surface 32 and a ray streaming from edge B past the next adjacent heat generating element 26 and just over the tip of a curved fin 34c on the opposite side of the next adjacent heat generating element. Assuming that the shape of 34c is approximately parabolic, the radiation direct from side surface 32 will reach an arc 40 extending from point Bdl to point Adr. And, the rays reflected from surface 36 of fin 34c will reach an identical arc 44. Thus, taking account for arc 42 which is blocked by fin 34c, the use of a parabolically curved fin 34c enables side surface 32 to "see" an arc of thermal radiator panel 20 which is approxmately twice as long as the arc which would be seen n the absence of curved fin 34c.

Figure 5:
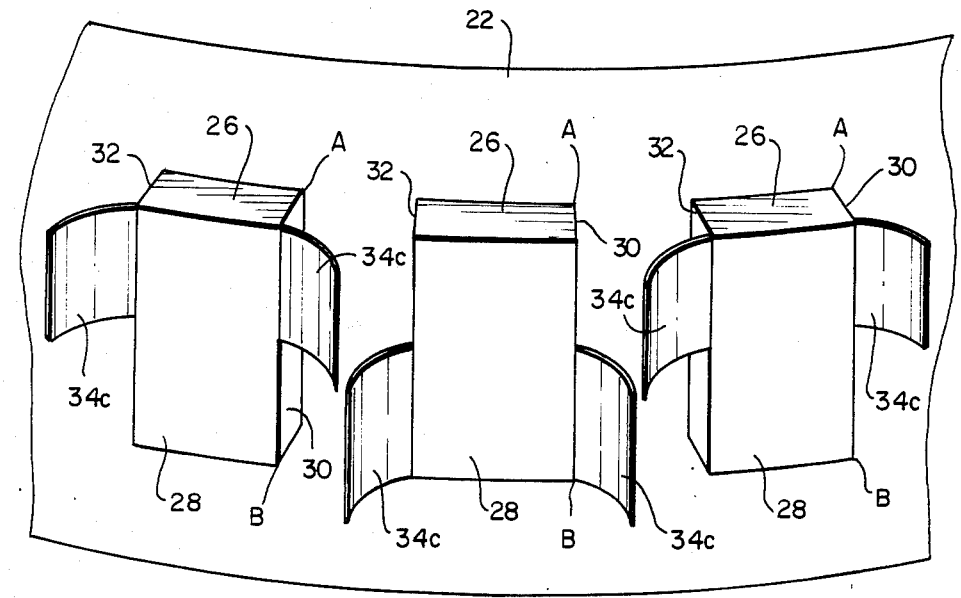
FIG. 5 shows a fragmentary perspective of FIG. 1 illustrating staggered curved reflector means according to the invention.

FIG. 5 shows a fragmentary perspective view of the interior portion of a satellite in which the heat generating elements 26 have been provided with fins 34c of the type illustrated in FIG. 4. When the heat generating elements are rather closely spaced circumferentially, the presence of curved fins 34c on one heat generating element can interfere with radiation of heat from the axially extending side surfaces of the next adjacent heat generating element. Because of this, curved fins 34c preferably are staggered on the opposing edges B of adjacent heat generating elements, thereby giving each curved fin a relatively clear streaming path toward the surrounding thermal radiator panel 20. In this configuration, the electronic components within each heat generating element 26 can be preferentially arranged so that the hotter elements will be positioned at the end of the heat generating element which has been provided with fins 34c. Alternatively, it may be practical in some applications to include the hottest electronic components in one generating element and provide that heat generating element with fins extending along the entire length of its outermost axially extending edges B and then place cooler components in the adjacent heat generating element which would be provided with no fins. Other arrangements of heat generating elements and fins of the type disclosed will be apparent to those skilled in the art; however, the scope of the invention is to be limited only by the appended claims.

Figure 6:
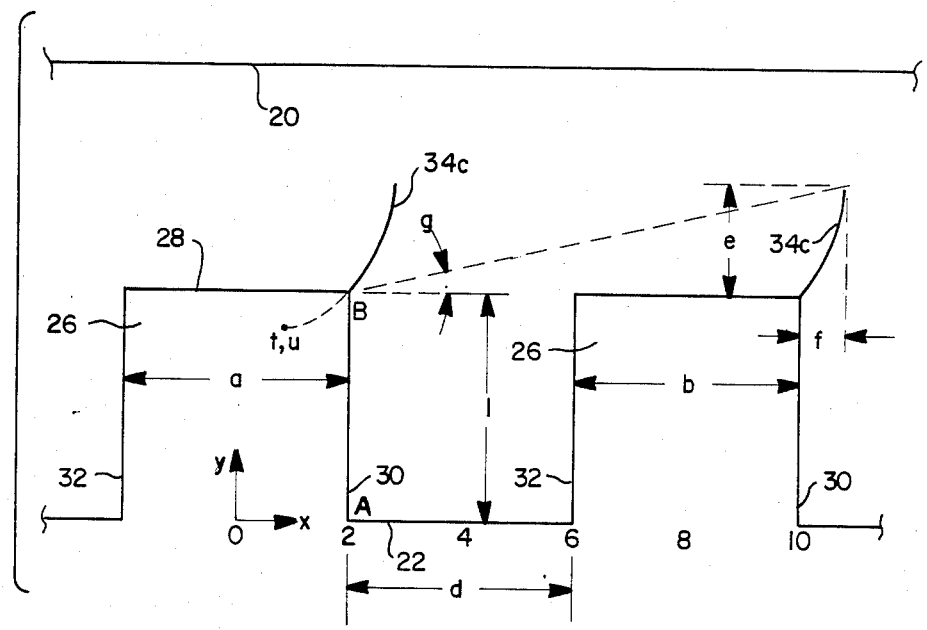
FIG. 6 shows a schematic view of the annulus between the interior portion and the exterior housing of a satellite, illustrating one technique for sizing and positioning a curved heat reflector means according to the invention.

FIG. 6 illustrates schematically a pair of heat generating elements 26 extending into the annulus between the interior portion 22 and the thermal radiator panel 20 of a satellite. For simplicity, the diameter of the satellite to has been assumed to be large enough to justify the assumption that the surface of interior portion 22 and radiator panel 20 are essentially flat for a given pair of heat generating elements.

Referring to FIG. 6, let
l = height of elements 26
d = distance between elements
a = width of left element
b = width of right element
e = extent of fin 34c above elements
f = extent of fin 34c to side of elements
g = elevation angle of fin measured from base of fin on adjacent element
x,y = coordinate axes with origin at center of base of left element
t,u = coordinates of vertex of curve of parabolic fin 34c.

Assuming that a ray from edge A will be essentially tangent to fin 34c at its tip; that fin 34c is parabolic in shape with a semilatus rectum of r; and that a normal to the surface of the fin at edge B will bisect the angle between side 32 and the ray streaming at angle g from edge b, then the equations for fin 34c are:

$$t^2 - 2Lt + L^2 - 4r(l-u) = 0 \text{ and} \quad (1)$$

$$L - t = 2rP, \text{ where} \quad (2)$$

$$g = \frac{\pi}{4} + 0.5 \tan^{-1}\left(\frac{e}{d+b+f}\right) \quad (3)$$

$$P = \tan g \text{ and} \quad (4)$$

$$L = a/2. \quad (5)$$

The parameters l, e, b, d, f, a and g are set primarily by the existing geometry of the satellite as indicated schematically in FIG. 6. The variables t, u and r can be computed by an iterative procedure, such as the following: Let l=4.0; e=1; f=1; d=4; b=4; and L=2. Then P=tan g=1.117 from Eq. (4). Assuming for the initial iteration that t=1.0 and solving Eqs. (1) and (2), u=3.441 and r=0.448. This set of t, u, and r leads to a change in f from 1.0 to 0.670. Further iterations lead to convergence, in this non-limiting example, with t=1.0, u=3.451 and r=0.455. Once convergence is reached angle g is determined and a straight fin approximation can be made with an elevation angle $$S \geq \left(\frac{\pi}{4} + g/2\right).$$

Referring again to FIG. 4, arc 42 represents the area of thermal radiator panel 20 which is no longer available for direct radiation from side 32. Arc 44, equal in length to arc 40, represents the additional area of thermal radiator panel 20 which becomes avaiable due to reflection from surface 36 of fin 34c. If I is the radiation area improvement per fin, then $$I = \frac{2 \times arc\ 40}{arc\ 40 + arc\ 42}.$$

If arc 42 is approximately 0.1 (arc 40), as would be reasonable for a parabolic fin, then $$I = \frac{2 \times arc\ 40}{1.1\ (arc\ 40)} = 1.818,$$

or an increase in view factor area of more than 80%.

Having described my invention in sufficient detail to enable those skilled in the art to make and use it, I claim:

1. In an earth orbiting satellite of the type including an exterior housing having an axis and a thermal radiator panel extending at least partially therearound, an interior portion supported by said exterior housing, and a plurality of heat generating elements positioned on said interior portion at circumferentially spaced locations radially opposite to said thermal radiator panel, said heat generating elements being spaced radially inwardly from said thermal radiator panel and having circumferentially facing side surfaces with outer axially extending edges, and said heat generating elements being configured to radiate heat radially toward said thermal radiator panel and axially into an annulus defined between said interior portion and said exterior housing, the improvement comprising:

reflector means of thermally conductive material mounted adjacent at least a portion of said outer axially extending edge and extended radially outward into said annulus, said reflector means including a specular reflecting surface facing toward said side surface for reflecting heat radiated from said side surface toward a first arc of said thermal radiator panel larger than would be reached by heat radiating directly to said radiator panel in the absence of said reflector means, and an emissive surface facing away from said side surface for radiating toward a second arc of said thermal radiator panel heat conducted to said reflector means from said heat generating element, said emissive surface being darkened to have high thermal emissivity.

2. The improvement according to claim 1, wherein said outer edges are straight and said reflector means on one of said heat generating elements extends along a first portion of one of said outer edges and circumferentially toward the next circumferentially spaced heat generating element, while said reflector means on said next heat generating element extends along a second, Staggered portion of another of said outer edges and circumferentially back toward said one of said heat generating elements, whereby said reflector means on said one heat generatng element do not block heat reflected from said reflector means on said next generating element.

3. The improvement according to claim 1, wherein said specular surface compriaes a planar mirrored surface.

4. The improvement according to claim 1, wherein said specular surface comprises a convex mirrored surface.

5. The improvement according to claim 4, wherein said convex mirrored surface is parabolic in shape.

6. The improvement according to claim 1, wherein said reflector means comprises fins made from said thermally conductive material and provided with said emissive surface facing away from said side surfaces, whereby heat is conducted from said heat generating elements along said fins and radiated from said emissive surface toward said radiator panel.

7. In an earth orbiting satellite of the type including an exterior housing having an axis and a thermal radiator panel extending at least partially therearound, an interior portion supported by said exterior housing, and a plurality of heat generating elements positioned on said interior portion at circumferentially spaced locations radially opposite to said thermal radiator panel, said heat generating elements being spaced radially inwardly from said thermal radiator panel and having circumferentially facing side surfaces with outer axially extending edges, and said heat generating elements being configured to radiate heat radially toward said thermal radiator panel and axially into the annulus defined between said interior portion and said exterior housing, the improvement comprising:

reflector means mounted adjacent at least a portion of said outer axially extending edge and extended into said annulus for reflecting heat radiated from said side surface toward a larger arc of said thermal radiator panel than would be reached by heat radiating directly to said radiator panel in the absence of said reflector means, said reflector means on one of said heat generating elements extending along a first portion of one of said outer edges and circumferentially toward the next circumferentially spaced heat generating element, and said reflector means on said next heat generating element extending along a second portion of another of said outer edges and circumferentially back toward said one of said heat generating elements, said first portion and said second portion being circumferentially staggered relative to each other such that said reflector means on said one heat generating element does not block heat reflected from said reflector means on said next heat generating element.

8. The improvement according to claim 7, wherein said reflector means are made from thermally conductive material and have a specular reflecting surface facing toward said side surface at said portion of said axially extending outer edges and a high emissivity surface facing away from said side surface toward said radiator panel.

9. The improvement according to claim 7, wherein said reflector means comprises a planar mirrored surface facing toward said side surface.

10. The improvement according to claim 7, wherein said reflector means comprises a convex mirrored surface facing toward said side surface.

11. The improvement according to claim 10, wherein said convex mirrored surface is parabolic in shape.

12. The improvement according to claim 7, wherein said reflector means comprises fins made from a thermally conductive material and provided with a high emissivity surface facing away from said side surfaces such that heat is conducted from said heat generating elements along said fins and radiated from said high emissivity surface toward said radiator panel.

13. The improvement according to claim 12, wherein said fins are provided with specular reflecting surfaces facing toward said side surfaces.

14. The improvement according to claim 7, wherein the outer axially extending edges of said heat generating elements are straight.

* * * * *